United States Patent
Stappert

(10) Patent No.: US 10,678,920 B2
(45) Date of Patent: Jun. 9, 2020

(54) ELECTRONIC DEVICE AND PROTECTION METHOD

(71) Applicant: NXP B.V., Eindhoven (NL)

(72) Inventor: Sebastian Stappert, Hamburg (DE)

(73) Assignee: NXP B.V., Eindhoven (NL)

( * ) Notice: Subject to any disclaimer, the term of this patent is extended or adjusted under 35 U.S.C. 154(b) by 12 days.

(21) Appl. No.: 15/476,951

(22) Filed: Mar. 31, 2017

(65) Prior Publication Data

US 2017/0286682 A1   Oct. 5, 2017

(30) Foreign Application Priority Data

Mar. 31, 2016  (EP) .................................... 16163141

(51) Int. Cl.
| | |
|---|---|
| *G06F 21/56* | (2013.01) |
| *G06F 11/07* | (2006.01) |
| *G06F 21/55* | (2013.01) |
| *G06F 21/57* | (2013.01) |
| *H04L 29/06* | (2006.01) |

(52) U.S. Cl.
CPC ........ *G06F 21/566* (2013.01); *G06F 11/0724* (2013.01); *G06F 11/0766* (2013.01); *G06F 21/554* (2013.01); *G06F 21/567* (2013.01); *G06F 21/568* (2013.01); *G06F 21/577* (2013.01); *H04L 63/1433* (2013.01); *H04L 63/1441* (2013.01); *G06F 2221/2123* (2013.01)

(58) Field of Classification Search
CPC ............. H04L 63/1433; H04L 63/1441; H04L 63/1416; G06F 21/55; G06F 21/566; G06F 21/554; G06F 21/577
See application file for complete search history.

(56) References Cited

U.S. PATENT DOCUMENTS

| | | | |
|---|---|---|---|
| 7,490,347 B1* | 2/2009 | Schneider ........... | H04L 63/0815 713/157 |
| 8,352,752 B2 | 1/2013 | Croguennec et al. | |
| 2004/0003286 A1* | 1/2004 | Kaler ................... | G06F 21/554 726/25 |
| 2004/0044912 A1* | 3/2004 | Connary ............... | H04L 43/045 726/23 |

(Continued)

FOREIGN PATENT DOCUMENTS

| | | |
|---|---|---|
| CN | 102945334 A | 9/2012 |
| EP | 2806371 A1 | 11/2014 |

*Primary Examiner* — Dao Q Ho

(57) ABSTRACT

According to a first aspect of the present disclosure, an electronic device is provided, comprising: an attack detection unit arranged to detect one or more attacks on the electronic device; a countermeasure unit arranged to apply countermeasures against the attacks detected by the attack detection unit; a threat level determination unit arranged to determine a threat level corresponding to the attacks detected by the attack detection unit; wherein the countermeasure unit is further arranged to activate one or more specific ones of said countermeasures in dependence on the threat level determined by the threat level determination unit. According to a second aspect of the present disclosure, a corresponding method of protecting an electronic device is conceived. According to a third aspect of the present disclosure, a corresponding computer program product is provided.

15 Claims, 4 Drawing Sheets

(56) References Cited

U.S. PATENT DOCUMENTS

2012/0233698 A1\* 9/2012 Watters ................ G06F 21/554
  726/25
2012/0255005 A1 10/2012 Yoshimi
2013/0159791 A1\* 6/2013 Marinet ................ G06F 21/554
  714/48

\* cited by examiner

ELECTRONIC DEVICE AND PROTECTION METHOD

CROSS-REFERENCE TO RELATED APPLICATIONS

This application claims the priority under 35 U.S.C. § 119 of European patent application no. 16163141.1, filed on Mar. 31, 2016, the contents of which are incorporated by reference herein.

FIELD

The present disclosure relates to an electronic device. Furthermore, the present disclosure relates to a method of protecting an electronic device and to a corresponding computer program product.

BACKGROUND

Today, security plays an important role in many electronic devices and computing environments. This is especially the case for high-security devices for payment applications and E-government applications. Examples of such devices are secure elements embedded in mobile phones, smart cards, and passports or identity cards. A secure element may for example be an embedded chip, more specifically a tamper-resistant integrated circuit with installed or pre-installed smart-card-grade applications, for instance payment applications, which have a prescribed functionality and a prescribed level of security. Furthermore, a secure element may implement security functions, such as cryptographic functions and authentication functions. Also in the Internet-of-Things and in automotive applications the demand for secure solutions is increasing. Thus, secure elements may be used in these areas as well. There is a need to protect such devices against various attacks. Also, other kinds of chips, or larger devices which contain multiple chips such as processor modules and co-processor modules, may need to be protected against attacks.

SUMMARY

According to a first aspect of the present disclosure, an electronic device is provided, comprising: an attack detection unit arranged to detect one or more attacks on the electronic device; a countermeasure unit arranged to apply countermeasures against the attacks detected by the attack detection unit; a threat level determination unit arranged to determine a threat level corresponding to the attacks detected by the attack detection unit; wherein the countermeasure unit is further arranged to activate one or more specific ones of said countermeasures in dependence on the threat level determined by the threat level determination unit.

In one or more embodiments, the threat level depends on the amount of attacks detected by the attack detection unit.

In one or more embodiments, the threat level depends on the type of attacks detected by the attack detection unit.

In one or more embodiments, different subsets of said countermeasures correspond to different security levels, and the countermeasure unit is arranged to activate specific ones of said subsets in dependence on the threat level detected by the threat level determination unit.

In one or more embodiments, the security levels are configurable in that the subsets of countermeasures corresponding to said security levels are alterable.

In one or more embodiments, the electronic device further comprises a plurality of security domains, and a security level is assigned to each security domain.

In one or more embodiments, the countermeasure unit is further arranged to deactivate specific ones of said countermeasures in dependence on the threat level determined by the threat level determination unit.

In one or more embodiments, the electronic device further comprises a reset interface unit for receiving a reset instruction from an external device, and the countermeasure unit is further arranged to activate and/or deactivate specific ones of said countermeasures in response to said reset instruction.

In one or more embodiments, the countermeasure unit is further arranged to activate and/or deactivate specific ones of said subsets of countermeasures in response to the reset instruction.

In one or more embodiments, the electronic device further comprises a configuration interface unit for receiving a configuration instruction from an external device, and the countermeasure unit is arranged to alter at least one subset of countermeasures in response to said configuration instruction.

In one or more embodiments, the countermeasure unit is further arranged to redefine at least one security domain in dependence on the threat level determined by the threat level determination unit.

In one or more embodiments, the countermeasure unit is further arranged to increase the amount of active countermeasures in response to an increased threat level and/or to decrease the amount of active countermeasures in response to a decreased threat level.

In one or more embodiments, the electronic device is a secure element.

According to a second aspect of the present disclosure, a method of protecting an electronic device is conceived, said electronic device comprising an attack detection unit, a countermeasure unit and a threat level determination unit, and the method comprising: the attack detection unit detects one or more attacks on the electronic device; the threat level determination unit determines a threat level corresponding to the attacks detected by the attack detection unit; the countermeasure unit activates one or more specific countermeasures against said attacks in dependence on the threat level determined by the threat level determination unit.

According to a third aspect of the present disclosure, a computer program product is provided, the computer program product comprising instructions which, when being executed by a processing unit, cause said processing unit to carry out or control a method of the kind set forth.

DESCRIPTION OF DRAWINGS

Embodiments will be described in more detail with reference to the appended drawings, in which.

DESCRIPTION OF EMBODIMENTS

As mentioned above, the use of so-called secure elements has increased. These devices need to be protected against various attacks. Also, other devices, for example larger devices which contain multiple chips, may need to be protected against attacks. These attacks may include sophisticated attacks, such as semi-invasive attacks (e.g., fault injection using a laser) and non-invasive attacks (e.g., side-channel attacks, more specifically differential power analysis attacks). In response to these attacks, many security features (i.e., countermeasures) have been developed. However, the devices under attack often have limited computing power and resources. Furthermore, the performance (e.g., the processing speed) of these devices should not be negatively affected by applying, for example, an excessive amount of security features.

Figure 1:
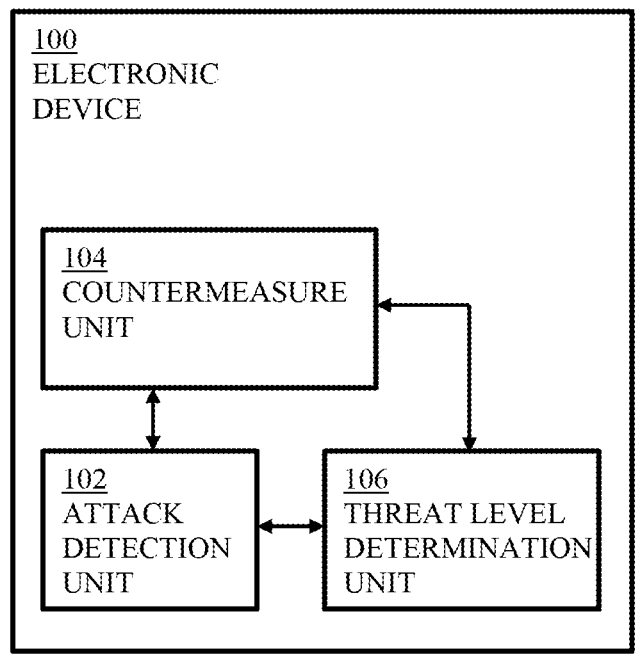
FIG. 1 shows an illustrative embodiment of an electronic device.

FIG. 1 shows an illustrative embodiment of an electronic device 100 in accordance with the present disclosure. The electronic device 100 comprises an attack detection unit 102 and a countermeasure unit 104 operatively coupled to the attack detection unit 102. Furthermore, the electronic device 100 comprises a threat level determination unit 106 operatively coupled to the attack detection unit 102 and the countermeasure unit 104. The skilled person will appreciate that, although the units 102, 104, 106 have been shown as separated from each other, some or all of these units 102, 104, 106 may in practice be combined or integrated into a single component. For example, it is useful to integrate the attack detection unit 102 with the countermeasure unit 104, because in practice they may work closely together, in particular because attacks may be detected as a result of active countermeasures. For example, a countermeasure against fault attacks is the so-called double read feature, which consists of a redundant read operation performed a certain amount of time after a real read operation. In fact, such a countermeasure facilitates the detection of fault attacks, and thus the attack detection unit 102 and countermeasure unit 104 may be regarded as a single unit. In another example, the attack detection unit 102 and countermeasure unit 104 might be less entangled. For instance, the countermeasure unit 104 might be a computer program which implements countermeasures against side channel attacks. In that case, a countermeasure might be to hide real operations within dummy operations. Then, the countermeasure itself does not facilitate the detection of an attack, but the attack detection unit 102 might detect that an attack takes place by monitoring how often a function containing such operations is executed within a given amount of time.

Figure 2:
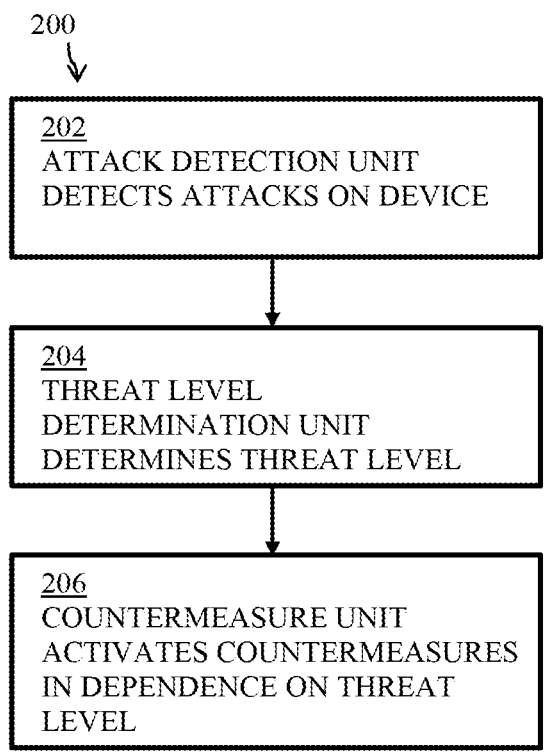
FIG. 2 shows an illustrative embodiment of a method of protecting an electronic device.

FIG. 2 shows an illustrative embodiment of a method 200 of protecting an electronic device. The method comprises the following steps. At 202, the attack detection unit 102 detects one or more attacks on the electronic device 100. At 204, the threat level determination unit 106 determines a threat level corresponding to the attacks detected by the attack detection unit 102. Furthermore, at 206, the countermeasure unit 104 activates specific countermeasures against said attacks in dependence on the threat level determined by the threat level determination unit 106. Thereby, balancing security and device performance may be facilitated. In particular, countermeasures may be activated only if a certain threat level is determined, and not in response to every detected attack. For example, the threat level may in a simple implementation be based on the amount of detected attacks. Thus, the threat level may be a function of the amount of detected attacks, and when the threat level reaches a certain predefined threshold value, the threat level determination unit 106 may trigger the countermeasure unit 104 to activate any available countermeasure. In that case, no countermeasures need be active initially, so that the device performance is not negatively affected. Alternatively or in addition, the threat level may be based on the type of detected attacks. Thus, the threat level may be a function of the amount and/or type of detected attacks. For example, if the attack detection unit 102 has detected one or more fault attacks, the threat level determination unit 106 may trigger the countermeasure unit 104 to activate only countermeasures against fault attacks, and not every available countermeasure. This may again prevent that the device performance is negatively affected. In a practical and efficient implementation, the fault attack countermeasures may form a subset of countermeasures of the kind described with reference to FIG. 3, wherein said subset corresponds to a security level at which all fault attack countermeasures are active. A further improved balance between security and performance may be achieved by making the threat level a function of both the amount and the type of detected attacks. For instance, the countermeasure unit 104 may be able to apply countermeasures against various types of attacks, but the threat level determination unit 106 may trigger the countermeasure unit 104 to activate only countermeasures against fault attacks in case three or more fault attacks have been detected since the electronic device 100 has been initialized or reset. Thus, all other available countermeasures may remain inactive.

As mentioned above, in one or more embodiments, the countermeasure unit 104 is further arranged to deactivate specific ones of said countermeasures in dependence on the threat level determined by the threat level determination unit 106. In this way, if the threat level does not warrant that specific countermeasures are active, said countermeasures may easily be deactivated. For example, the threat level determination unit 106 may simply conclude that the threat level has decreased if no attacks have been detected by the attack detection unit 102 for a certain amount of time. Alternatively, the threat level determination unit 106 may be arranged to determine that the threat level has decreased if a successful authentication to the device has been performed, which an attacker presumably cannot perform. In a practical and efficient implementation, the countermeasure unit is further arranged to increase the amount of active countermeasures in response to an increased threat level and/or to decrease the amount of active countermeasures in response to a decreased threat level. In this way, it is relatively easy to realize a trade-off between the device performance and the security requirements.

Figure 3:
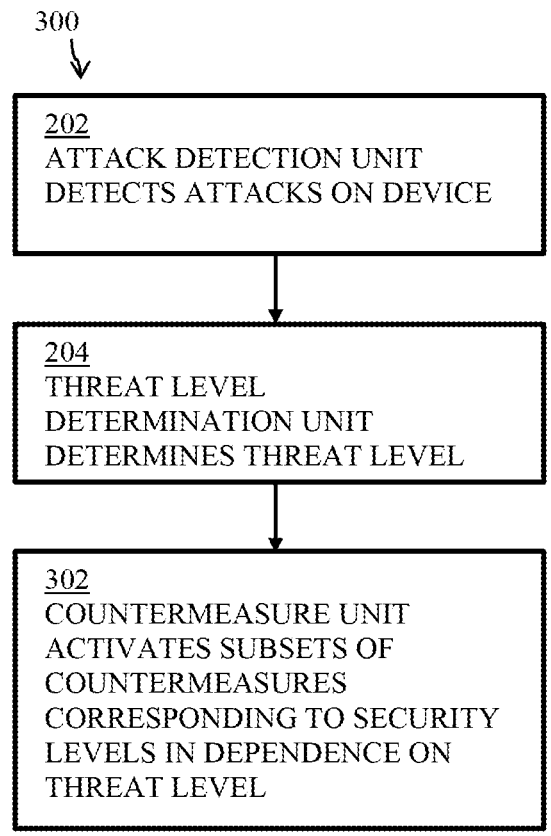
FIG. 3 shows another illustrative embodiment of a method of protecting an electronic device.

FIG. 3 shows another illustrative embodiment of a method 300 of protecting an electronic device. Again, at 202, the attack detection unit 102 detects one or more attacks on the electronic device 100. Furthermore, at 204, the threat level determination unit 106 again determines a threat level corresponding to the attacks detected by the attack detection unit 102. In this example, the countermeasure unit 104 activates, at 302, specific subsets of countermeasures in dependence on the threat level detected by the threat level determination unit 106. As mentioned above, in one or more embodiments, different subsets of countermeasures correspond to different security levels. These security levels may be levels which have been predefined for the electronic system implemented by the electronic device 100. This embodiment may realize a simple yet flexible mechanism for controlling the security features available in such a system. For example, the lowest security level (e.g., level 0) may correspond to an empty subset of countermeasures. This means that, at this security level, all countermeasures may be inactive. At a higher security level, the subset may contain some countermeasures, while at the highest security level the subset may contain all available countermeasures (i.e., at the highest security level all available countermeasures may be active). The different subsets may also relate to different types of attacks; for example, one subset may contain all fault attack countermeasures, while another subset may contain all side channel attack countermeasures. In accordance with the present disclosure, a complete subset of countermeasures may be activated at once in response to a certain detected threat level; this may further simplify the security feature management. If the security level for security domains can be adjusted easily, the device can be updated easily such that it can withstand the latest attacks. This may typically be done when the device is in already in use, i.e. "in the field". In particular, splitting the device into security domains may result in a higher flexibility to react. For example, only some security levels of some domains may need to be changed; this may already prevent a performance hit. Furthermore, in one or more embodiments, the security levels are configurable in that the subsets of countermeasures corresponding to said security levels are alterable. In this way, controlling the available security features may be made even more flexible.

Figure 4:
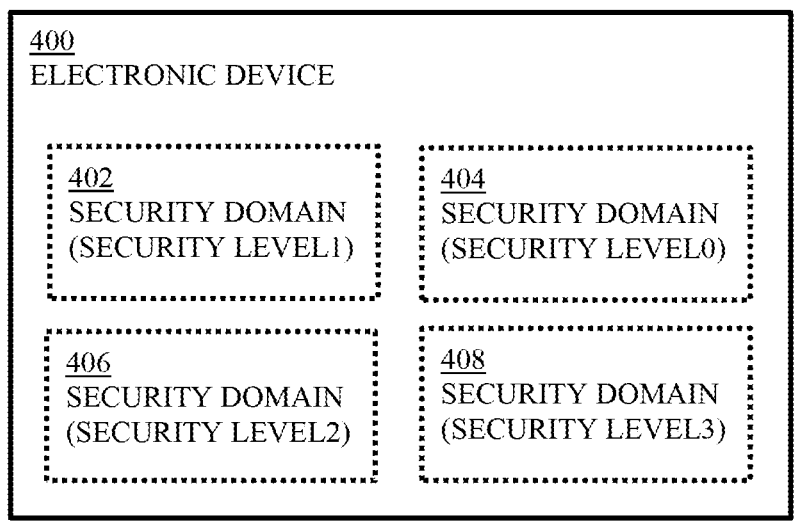
FIG. 4 shows another illustrative embodiment of an electronic device.

FIG. 4 shows another illustrative embodiment of an electronic device 400. The electronic device 400 comprises a plurality of security domains 402, 404, 406, 408. In this embodiment, one of the aforementioned security levels is assigned to each security domain 402, 404, 406, 408. For example, as shown in FIG. 4, a first security domain 402 has security level "1", a second security domain 404 has security level "0", a third security domain 406 has security level "2", and a fourth security domain 408 has security level "3". Security level "3" may, for example, be a high security level having a large subset of countermeasures, while security level "0" may be the lowest security level. The skilled person will appreciate that a given security level may be assigned to more than one security domain 402, 404, 406, 408. For instance, security level "2" may be assigned to a plurality of other security domains (not shown) in addition to being assigned to security domain 406.

In particular, an electronic system may be separated into different security domains 402, 404, 406, 408. This can be done within the hardware or within the software (e.g., within an operating system) or within both the hardware and the software. Within the hardware there may be different domains, such as a central processing unit (CPU) and dedicated security processors (e.g., cryptographic co processors). Within the software running on the electronic device the security domains 402, 404, 406, 408 may be the different layers of the software (e.g., firmware, core operating system, application programs), the different tasks or contexts of a computer program, or any other physical and/or logical separation. In general, an electronic system (either hardware and/or software) may be separated into different security domains 402, 404, 406, 408 according to potentially varying security requirements. Each of these security domains may have a predefined security level. Furthermore, the security level of a security domain may be changed, for example in response to a configuration instruction received from an external device, so that it is relatively easy to realize a trade-off between performance and security requirements in a system comprising a plurality of different components. The skilled person will appreciate that these components may be separate chips of a multi-chip device or components of a single chip. Furthermore, using the security domains the device has the flexibility to adjust the security level within certain security domains only, and not within the complete system. Thereby, the risk of a performance hit may be further reduced. It is noted that the external device may be a local device an offline device) or a remote device (e.g., an online device). In either case, the external device may be managed by a trustworthy party that is authorized to configure the security settings of the system. For instance, the external device may be a remote device implemented as a trust center that may configure the system over-the-air. In that case, the external device may access the electronic device 400 through a secure communication channel. Furthermore, the external device may have to authenticate itself towards the electronic device 400 in order to obtain access to it. Furthermore, it is noted that the security domains may also be redefined by the countermeasure unit 104, as will be explained with reference to FIG. 7.

Figure 5:
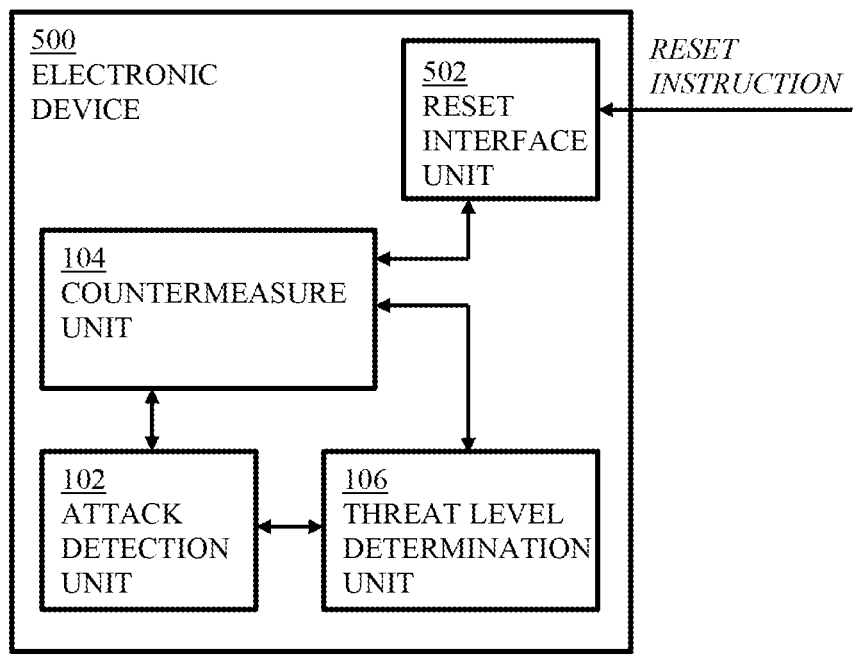
FIG. 5 shows a further illustrative embodiment of an electronic device.

FIG. 5 shows a further illustrative embodiment of an electronic device 500. In addition to the components shown in FIG. 1, the electronic device 500 comprises a reset interface unit 502 operatively coupled to the countermeasure unit 104. In this embodiment, the reset interface unit 502 is arranged to receive a reset instruction from an external device, for example a device managed by a trusted authority. Furthermore, the countermeasure unit is arranged to activate and/or deactivate specific countermeasures in response to the reset instruction. In this way, specific countermeasures may easily be reset to an active or inactive state (for example to their initial state) by a trusted authority. Furthermore, the countermeasure unit may be arranged to activate and/or deactivate specific subsets of countermeasures in response to the reset instruction. In this way, complete subsets of countermeasures (i.e., security levels) may easily be reset to a previous state by a trusted authority.

Figure 6:
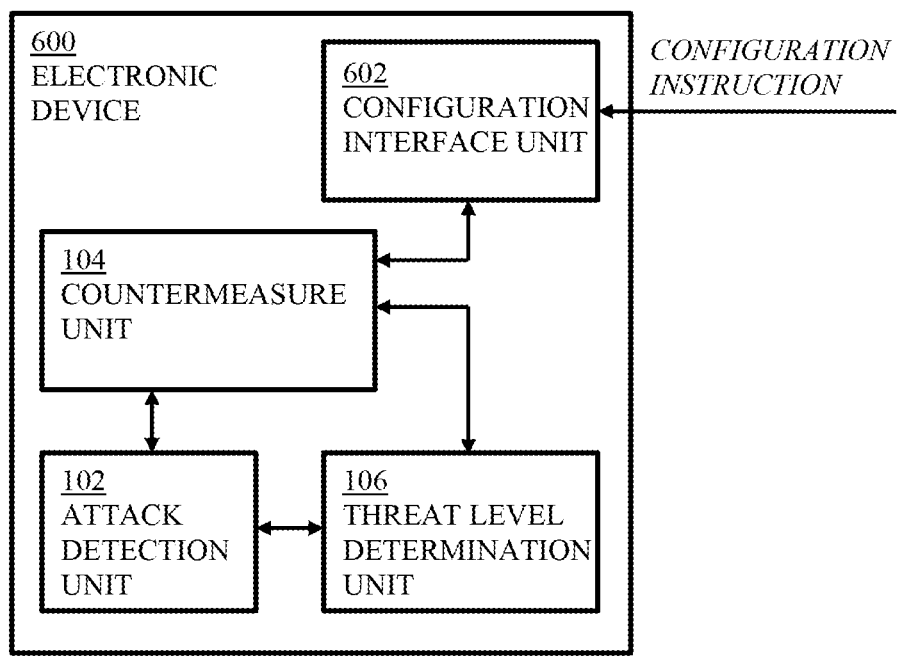
FIG. 6 shows a further illustrative embodiment of an electronic device.

FIG. 6 shows a further illustrative embodiment of an electronic device 600. In addition to the components shown in FIG. 1, the electronic device 600 comprises a configuration interface unit 602 operatively coupled to the countermeasure unit 104. In this embodiment, the configuration interface unit 602 is arranged to receive a configuration instruction from an external device, for example a device managed by a trusted authority. It is noted that the configuration interface unit 602 may in practice be the same unit as the reset interface unit 502 shown in FIG. 5. Alternatively, the configuration interface unit 602 and the reset interface unit 502 may be separate units. In this embodiment, the countermeasure unit 104 is arranged to alter at least one subset of countermeasures in response to said configuration instruction. In this way, the subset of countermeasures belonging to a particular security level may easily be managed by a trusted authority. For example, the device may be upgraded by adding newly developed countermeasures to a particular subset.

Figure 7:
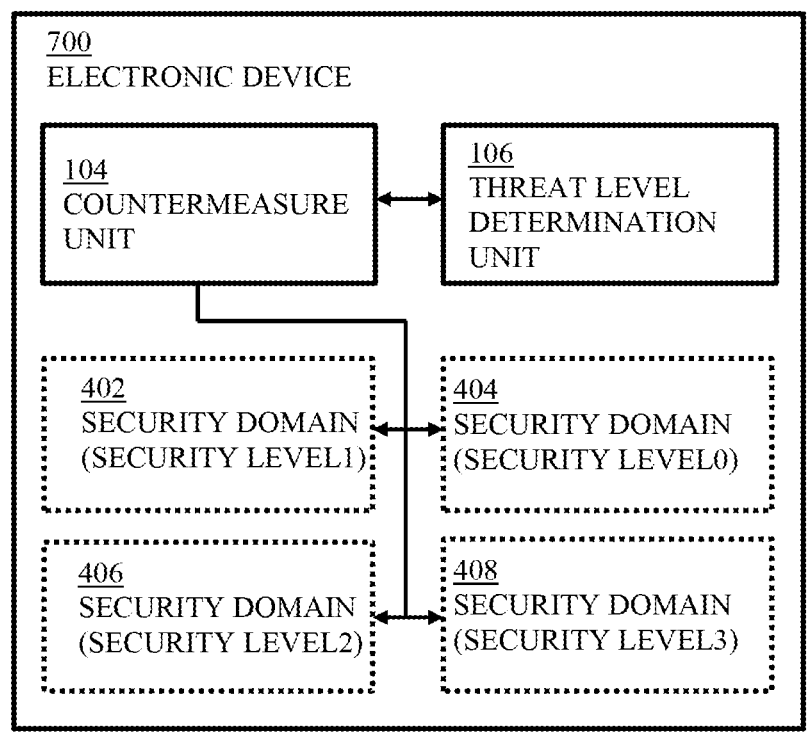
FIG. 7 shows a further illustrative embodiment of an electronic device.

FIG. 7 shows a further illustrative embodiment of an electronic device 700. In this example, the countermeasure unit 104 is further arranged to redefine at least one security domain in dependence on the threat level determined by the threat level determination unit 106. This may be done autonomously by the countermeasure unit 104, or in response to a configuration instruction received through the above-described configuration interface unit. A security domain may be redefined in the sense that its contents (i.e., the hardware and/or software components which are defined as being included in said domain) may be altered. By allowing the countermeasure unit 104 to redefine security domains, the flexibility of the system may be further increased.

Two examples will now be described. These examples may among others be applicable to smart cards and secure elements used for payment, E-government and mobile applications. The skilled person will appreciate that, although the presently disclosed device is described in the context of specific types of attacks, its use is not limited thereto. That is to say, other types of attacks are also within the scope of the appended claims, for example logical software attacks (e.g., remote attacks which exploit software vulnerabilities) and other physical attacks (e.g. reverse engineering).

In the first example, the hardware of a device may implement different security features for securing the software against attacks on the code execution and data fetches (so called fault attacks). A typical countermeasure is a "double read feature" of the data and code. Furthermore, the hardware may offer a "triple read feature". The triple read feature is more secure but has an impact on the performance (execution time). In this example, two security levels may be defined by the software (optionally within different security domains): "Double read" and "Triple read". When the device is deployed into the field the first security level ("Double read") is set. If at some point the device is attacked in the field and the device detects the attack it may autonomously increase its security level, i.e. set the second security level ("Triple read"). This will impact the performance, but only if the device is actually attacked in the field. The owner or another trustworthy party may have the possibility to reset the device to the first security level ("Double read"). This kind of security self-management may also be done by the hardware itself. For example, the hardware may switch from double to triple read in case an attack has been detected by the "Double read" countermeasure. Thus, in this case, the applied countermeasure facilitates the detection of new attacks.

In the second example, the software of a device may implement countermeasures against side channel attacks, for example against attacks that utilize the power consumption of the device to obtain information on secret key material. A typical countermeasure is to hide real operations within dummy operations; the use of a particular dummy operation may thus be regarded as a specific countermeasure. The number of dummy operations will impact the execution time of the device. Thus, the lowest security level might not use any countermeasure (i.e., no dummy operation at all). This lowest security level may be the initial security level of the device. If the attack detection unit detects that the device is under attack, the countermeasure unit may set a higher security level (i.e., activate a subset of countermeasures, each of which comprises the use of a particular dummy operation). If it is further under attack it may set an even higher security level corresponding to a different subset of countermeasures (for instance, containing a higher amount of countermeasures, i.e. dummy operations).

It is noted that the presently disclosed electronic device may contain electronic circuitry that implements the attack detection unit, countermeasure unit, and threat level determination unit. Each of the attack detection unit, countermeasure unit, and threat level determination unit may be implemented in hardware and/or software. Furthermore, the attack detection unit, countermeasure unit, and threat level determination unit may be implemented as separate electronic circuits, each of which may contain a combination of hardware and software. Alternatively, at least two of the attack detection unit, countermeasure unit, and threat level determination unit may be implemented as a single electronic circuit that may contain a combination of hardware and software.

Furthermore, the presently disclosed method may at least partly be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer-readable medium, which may include storage devices and signals, in compressed or uncompressed form.

As used herein, the term "mobile device" refers to any type of portable electronic device, including a cellular telephone, a Personal Digital Assistant (PDA), smartphone, tablet etc. Furthermore, the term "computer" refers to any electronic device comprising a processor, such as a general-purpose central processing unit (CPU), a specific-purpose processor or a microcontroller. A computer is capable of receiving data (an input), of performing a sequence of predetermined operations thereupon, and of producing thereby a result in the form of information or signals (an output). Depending on the context, the term "computer" will mean either a processor in particular or more generally a processor in association with an assemblage of interrelated elements contained within a single case or housing.

The term "processor" or "processing unit" refers to a data processing circuit that may be a microprocessor, a co-processor, a microcontroller, a microcomputer, a central processing unit, a field programmable gate array (FPGA), a programmable logic circuit, and/or any circuit that manipulates signals (analog or digital) based on operational instructions that are stored in a memory. The term "memory" refers to a storage circuit or multiple storage circuits such as read-only memory, random access memory, volatile memory, non-volatile memory, static memory, dynamic memory, Flash memory, cache memory, and/or any circuit that stores digital information.

As used herein, a "computer-readable medium" or "storage medium" may be any means that can contain, store, communicate, propagate, or transport a computer program for use by or in connection with the instruction execution system, apparatus, or device. The computer-readable medium may be, for example but not limited to, an electronic, magnetic, optical, electromagnetic, infrared, or semiconductor system, apparatus, device, or propagation medium. More specific examples (non-exhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, a portable compact disc read-only memory (CDROM), a digital versatile disc (DVD), a Blu-ray disc (BD), and a memory card.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 electronic device
102 attack detection unit
104 countermeasure unit
106 threat level determination unit
200 protection method
202 attack detection unit detects on IC
204 threat level determination unit determines threat level
206 countermeasure unit activates countermeasures in dependence on threat level
300 protection method
302 countermeasure unit activates subsets of countermeasures corresponding to security levels in dependence on threat level
400 electronic system
402 security domain (security level 1)
404 security domain (security level 0)
406 security domain (security level 2)
408 security domain (security level 3)
500 electronic device
502 reset interface unit
600 electronic device
602 configuration interface unit
700 electronic device

The invention claimed is:

1. An electronic device comprising:
an attack detection unit arranged to detect a plurality of attacks on the electronic device;
a countermeasure unit arranged to apply countermeasures against the plurality of attacks detected by the attack detection unit;
a threat level determination unit arranged to determine one of a plurality of threat levels respectively corresponding to each of the plurality of attacks detected by the attack detection unit;
a plurality of security domains, wherein a security level is assigned to each security domain; and
a reset interface unit for receiving a reset instruction from an external device, wherein the countermeasure unit is further arranged to activate and/or deactivate specific ones of said countermeasures in response to said reset instruction,
wherein different subsets of the countermeasures correspond to different ones of the respective security levels, wherein the countermeasure unit is further arranged to activate specific ones of said subsets of the countermeasures in dependence on the threat level determined by the threat level determination unit, and
wherein each of said units includes circuitry.

2. The electronic device of claim 1, wherein the threat level depends on the number of attacks detected by the attack detection unit.

3. The electronic device of claim 1, wherein the threat level depends on the type of attacks detected by the attack detection unit.

4. The electronic device of claim 1, wherein the security levels are configurable in that the subsets of countermeasures corresponding to said security levels are alterable.

5. The electronic device of claim 4, further comprising a configuration interface unit for receiving a configuration instruction from an external device, wherein the countermeasure unit is arranged to alter at least one subset of countermeasures in response to said configuration instruction.

6. The electronic device of claim 1, wherein the countermeasure unit is further arranged to deactivate specific ones of said countermeasures in dependence on the threat level determined by the threat level determination unit.

7. The electronic device of claim 1, wherein the countermeasure unit is further arranged to activate and/or deactivate specific ones of said subsets of countermeasures in response to the reset instruction.

8. The electronic device of claim 1, wherein the countermeasure unit is further arranged to redefine at least one security domain in dependence on the threat level determined by the threat level determination unit.

9. The electronic device of claim 1, wherein the countermeasure unit is further arranged to increase the amount of active countermeasures in response to an increased threat level and/or to decrease the amount of active countermeasures in response to a decreased threat level.

10. The electronic device of claim 1, being a secure element.

11. A computer program product comprising executable instructions stored on non-transitory computer readable medium which, when executed by a processing unit, cause said processing unit to carry out or control a method of protecting an electronic device, the electronic device having circuitry, the method comprising:
instructions for detecting, using an attack detection unit, a plurality of attacks on the electronic device;
instructions for applying, using a countermeasure unit, countermeasures against the plurality of attacks detected by the attack detection unit;

instructions for determining, using a threat level determination unit, one of a plurality of threat levels respectively corresponding to each of the plurality of attacks detected by the attack detection unit;

instructions for assigning a security level to each security domain of a plurality of security domains; and instructions for receiving, using a reset interface unit, a reset instruction from an external device, wherein the countermeasure unit is further arranged to activate and/or deactivate specific ones of said countermeasures in response to said reset instruction, wherein different subsets of the countermeasures correspond to different ones of the respective security levels, wherein the countermeasure unit is further arranged to activate specific ones of said subsets of the countermeasures in dependence on the threat level determined by the threat level determination unit, and wherein each of said units includes circuitry.

12. A method of protecting an electronic device, the method comprising:

detecting, using an attack detection unit, a plurality of attacks on the electronic device;

applying, using a countermeasure unit, countermeasures against the plurality of attacks detected by the attack detection unit;

determining, using a threat level determination unit, one of a plurality of threat levels respectively corresponding to each of the plurality of attacks detected by the attack detection unit;

assigning a security level to each security domain of a plurality of security domains; and receiving, using a reset interface unit, a reset instruction from an external device, wherein the countermeasure unit is further arranged to activate and/or deactivate specific ones of said countermeasures in response to said reset instruction, wherein different subsets of the countermeasures correspond to different ones of the respective security levels, wherein the countermeasure unit is further arranged to activate specific ones of said subsets of the countermeasures in dependence on the threat level determined by the threat level determination unit, and wherein each of said units includes circuitry.

13. The method of claim 12, further comprising, changing the security level assigned to one or more of the plurality of security domains in response to a configuration instruction received by the electronic device from an external device.

14. The method of claim 13, wherein the external device is managed by a party that is authorized to configure security for the electronic device, further including authenticating the external device through information received via a secure communication channel.

15. The method of claim 12, further comprising, adjusting the security level assigned to one or more of the plurality of security domains.

* * * * *